United States Patent
Patwardhan et al.

(10) Patent No.: US 8,971,885 B2
(45) Date of Patent: Mar. 3, 2015

(54) METHODS AND DEVICES FOR FACILITATING ACCESS TERMINAL REGISTRATIONS

(71) Applicant: QUALCOMM Incorporated, San Diego, CA (US)

(72) Inventors: Ravindra Manohar Patwardhan, San Diego, CA (US); Rashid Ahmed Akbar Attar, San Diego, CA (US); Christopher Gerard Lott, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 13/664,255

(22) Filed: Oct. 30, 2012

(65) Prior Publication Data
US 2013/0109382 A1    May 2, 2013

Related U.S. Application Data

(60) Provisional application No. 61/554,822, filed on Nov. 2, 2011, provisional application No. 61/554,828, filed on Nov. 2, 2011.

(51) Int. Cl.
H04W 4/00 (2009.01)
H04W 60/02 (2009.01)
H04W 8/20 (2009.01)

(52) U.S. Cl.
CPC .............. *H04W 60/02* (2013.01); *H04W 8/20* (2013.01); *H04W 4/005* (2013.01)
USPC ..................................................... 455/435.1

(58) Field of Classification Search
CPC ....... H04W 60/00; H04W 60/02; H04W 8/18; H04W 8/20
USPC ................... 455/435.1, 574, 434, 466, 435.3
See application file for complete search history.

(56) References Cited

U.S. PATENT DOCUMENTS 6,148,205 A * 11/2000 Cotton ................... 455/435.1
7,573,867 B1    8/2009 Welch
(Continued)

FOREIGN PATENT DOCUMENTS

EP        1619906 A1     1/2006
WO     2011099921 A1     8/2011

OTHER PUBLICATIONS

3GPP TS 23.060 V5.10.0, "3rd Generation Partnership Project; Technical Specification Group Services and System Aspects; General Packet Radio Service (GPRS); Service Description; Stage 2 (Release 5)", Mar. 2005.*

(Continued)

*Primary Examiner* — Brandon Miller
(74) *Attorney, Agent, or Firm* — QUALCOMM IP Department; James Hunt Yancy, Jr.

(57) ABSTRACT

Access terminals and network nodes are adapted to conduct access terminal registrations. In one example, an access terminal may obtain a data message for transmission, and registration information associated with the access terminal. The access terminal may send a message including the data message and the registration information. A network node can receive a message from an access terminal, where the received message includes a data message and access terminal registration information. The network node can register the access terminal with a network based on the access terminal registration information included in the received message. The network node can also process the data message included in the received message. Other aspects, embodiments, and features are also claimed and described.

32 Claims, 11 Drawing Sheets

(56) References Cited

U.S. PATENT DOCUMENTS

| | | | |
|---|---|---|---|
| 8,086,748 | B2 | 12/2011 | Mir et al. |
| 8,160,634 | B1 | 4/2012 | Vargantwar et al. |
| 2007/0230393 | A1 | 10/2007 | Sinha et al. |
| 2008/0107246 | A1 | 5/2008 | Burger et al. |
| 2009/0003208 | A1 | 1/2009 | Payyappilly et al. |
| 2009/0075669 | A1* | 3/2009 | Franceschini et al. ...... 455/452.2 |
| 2010/0057485 | A1 | 3/2010 | Luft |
| 2011/0128911 | A1 | 6/2011 | Shaheen |
| 2011/0140846 | A1 | 6/2011 | Blanz et al. |
| 2011/0170470 | A1 | 7/2011 | Sinnarajah et al. |
| 2011/0191426 | A1* | 8/2011 | Leifer ........................... 709/206 |
| 2011/0195709 | A1 | 8/2011 | Christensson et al. |
| 2011/0213871 | A1 | 9/2011 | Digirolamo et al. |
| 2011/0294507 | A1* | 12/2011 | Takagi ........................ 455/435.1 |
| 2012/0004003 | A1 | 1/2012 | Shaheen et al. |
| 2012/0020291 | A1 | 1/2012 | Nasielski et al. |
| 2012/0030358 | A1* | 2/2012 | MacKenzie ................... 709/226 |
| 2012/0058764 | A1 | 3/2012 | Kang et al. |
| 2012/0117140 | A1 | 5/2012 | Wang et al. |
| 2012/0218889 | A1 | 8/2012 | Watfa et al. |
| 2012/0284385 | A1 | 11/2012 | Kavanaugh et al. |
| 2013/0107803 | A1 | 5/2013 | Patwardhan et al. |
| 2013/0203344 | A1 | 8/2013 | Patwardhan et al. |

OTHER PUBLICATIONS

3GPP TR 23.888 V1.5.0 (Oct. 2011) 3rd Generation Partnership Project; Technical Specification Group Services and System Aspects; System Improvements for Machine-Type Communications; (Release 11).

Agrawal, P., et al., "Mobility and session management: UMTS vs. cdma2000", IEEE Wireless Communications, IEEE Service Center, Piscataway, NJ, US, vol. 11, No. 4, Aug. 1, 2004, pp. 30-43, XP011117200, ISSN: 1536-1284, DOI: 10.1109/MWC.2004.1325889, pp. 36-37.

Attar, R., et al., "1x enhancements for m2m (Stage 2); C20-20120206-XYZ QCOM; C20-20120206-008_Qualcomm_1x_m2m_stage2_v6", Feb. 5, 2012, pp. 1-50, XP055047709.

Attar R., et al., "Enhancements to CDMA2000 Ix for M2M communications", Globecom Workshops (GC WKSHPS), 2012 IEEE, IEEE, Dec. 3, 2012, pp. 1675-1680, XP032341637, DOI: 10.1109/GL0C0MW.2012.6477837 ISBN: 978-1-4673-4942-0 p. 1679.

He, L., et al., "1xM2M: Stage 3 changes for Joing R-FCH and R-SCH Assignment; C20-20120206-014_Qualcomm_1xM2M_Joint R-FCH_R-SCH_Assignment", Feb. 5, 2012, XP055047747.

He L., et al.,"1 xM2M: Stage 3 changes for Longer Timer Value for Timer-based Registration; C20-20120206-016_Qualcomm_1 xM2M_LongerTimerBasedRegistration", Feb. 5, 2012, pp. 1-10, XP055048087, Retrieved from the Internet: URL:http://ftp.3gpp2.org/TSGC/working/2012/2012-02-Nanjing/TSGC-2012-02-Nanjing/WG2/C20-20120206-016_Qualcomm_1 xM2M_LongerTimerBasedRegistration.doc [retrieved on Dec. 17, 2012].

Huawei et al: "Handling of MTC device specific periodic update timers", 3GPP Draft; S2-103506, 3rd Generation Partnership Project (3GPP), Mobile Competence Centre ; 650, Route Des Lucioles ; F-06921 Sophia-Antipolis Cedex ; France, vol. SA WG2, no. Brunstad; Sep. 3, 2010, Aug. 24, 2010, XP050458554, [retrieved on Aug. 24, 2010].

Inbar Anson Bratspiess: "Short Data Burst Support: Editorial Changes; C80216p-11_0269", Sep. 11, 2011, pp. 1-3, XP055047831.

International Search Report and Written Opinion—PCT/US2012/063060—ISA/EPO—Jan. 7, 2013.

Jou, Y.C., et al., "M2M over CDMA2000 1x case studies", Wireless Communications and Networking Conference (WCNC), 2011 IEEE, IEEE, Mar. 28, 2011, pp. 1546-1551, XP031876480, DOI: 10.1109/WCNC.2011.5779360 ISBN: 978-1-61284-255-4.

Kalle R.K., et al., "Optimizing Location update for stationary M2M devices ; C80216p-11_0010", IEEE Draft; C80216P-11_0010, IEEE-SA, Piscataway, NJ USA, vol . 802.16p, Mar. 3, 2011, pp. 1-4, XP017614357, [retrieved on Mar. 5, 2011].

Kpn et al: "Key Issue—Offline Small Data Transmissions", 3GPP Draft; S2-100097_0ffline Small Data, 3rd Generation Partnership Project (3GPP), Mobile Competence Centre ; 650, Route Des Lucioles ; F-06921 Sophia-Antipolis Cedex ; France, vol. SA WG2, no. Shenzhen; Jan. 18, 2010, Jan. 12, 2010, XP050432725.

Li, H., et al., "M2M Short Message Services in 16m; IEEE C802.16p-11_0164", Jul. 10, 2011, XP055047834.

Park G., et al.,"Location update procedure for 802.16p system ; C80216p-10 0017", IEEE Draft; C80216P-10_0017, IEEE Draft; C80216P-10_0017, IEEE-SA, Piscataway, NJ USA, vol . 802.16p, Dec. 30, 2010, pp. 1-7, XP017617646, [retrieved on Dec. 30, 2010].

"Part 16: Air Interface for Broadband Wireless Access Systems a ; P80216p_D1", IEEE Draft; P80216P_D1, IEEE-SA, Piscataway, NJ USA, vol. 802.16, No. D1, Oct. 8, 2011, pp. 1-43, XP017646970.

Vodafone: "Network operator issues for Machine-To-Machine Type Devices", 3GPP Draft; S2-102614, 3rd Generation Partnership Project (3GPP), Mobile Competence Centre ; 650, Route Des Lucioles ; F-06921 Sophia-Antipolis Cedex ; France, vol. SA WG2, no. Kyoto; May 10, 2010, May 4, 2010, XP050434730, [retrieved on May 4, 2010].

Yeh J.H., et al., "Comparative Analysis of Energy-Saving Techniques in 3GPP and 3GPP2 Systems", IEEE Transactions on Vehicular Technology, IEEE Service Center, Piscataway, NJ, US, vol. 58, No. 1, Jan. 1, 2009, pp. 432-448, XP011226380, ISSN: 0018-9545, DOI: 10.1109/TVT.2008.923687, p. 440.

Chapter II Demand and Article 34 Amendments with Response to Written Opinion, International Searching Authority, May 22, 2013 PCT/US2012/063060.

Notification of Transmittal of the International Preliminary Report on Patentability, International Preliminary Examining Authority, Feb. 3, 2014 PCT/US2012/063060.

* cited by examiner

| FIELD | LENGTH (bits) |
|---|---|
| PILOT_PN | 9 |
| CONFIG_MSG_SEQ | 6 |
| SID | 15 |
| NID | 16 |
| . | |
| . | |
| . | |
| PARAMETER_REG | 1 |
| REG_PRD | 7 |
| BASE_LAT | 22 |
| . | |
| . | |
| . | |
| DEVICE_CLASS1_REG_PRD | 7 |
| DEVICE_CLASS2_REG_PRD | 7 |
| ... | |
| DEVICE_CLASSN_REG_PRD | 7 |

System Parameters Message
MSG_TAG: SPM

FIG. 4

METHODS AND DEVICES FOR FACILITATING ACCESS TERMINAL REGISTRATIONS

CROSS REFERENCE TO RELATED APPLICATION & PRIORITY CLAIMS

The present Application for Patent claims priority to Provisional Application No. 61/554,822 entitled "PERIODIC REGISTRATION VALUE PER DEVICE CLASS" filed Nov. 2, 2011, and to Provisional Application No. 61/554,828 entitled "IMPLICIT REGISTRATION VIA DATA BURST MESSAGES" filed Nov. 2, 2011, both of which are assigned to the assignee hereof. Both are hereby expressly incorporated by reference herein.

TECHNICAL FIELD

Embodiments of the present invention relate generally to wireless communication, and more specifically, to devices, systems, and methods for facilitating access terminal registrations.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

A variety of devices are adapted to utilize such wireless communications systems. Such devices may be generally referred to as access terminals. Some access terminals may be stationary, or at least substantially stationary, such as access terminals adapted for machine-to-machine (M2M) communications (also sometimes referred to as machine-type communication or MTC). An M2M adapted access terminal may include an access terminal that is adapted to operate at least substantially without user interaction. Such M2M adapted access terminals may operate on a limited power source, such as a battery.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some instances, features which may conserve power and assist in extending the operating life of an access terminal's limited power source can be beneficial. Various features and aspects of the present disclosure are adapted to facilitate power conservation in an access terminal by facilitating optimized access terminal registrations.

According to at least one aspect of the present disclosure, access terminals may include a communications interface and a storage medium coupled with a processing circuit. The processing circuit can be adapted to obtain a data message for transmission via the communications interface, and obtain registration information associated with the access terminal. The processing circuit may further be adapted to send, via the communications interface, a message including the data message and the registration information.

Further aspects provide methods operational on access terminals and/or access terminals including means to perform such methods. One or more examples of such methods may include obtaining a data message for transmission and registration information associated with the access terminal. A message may be sent, where the message includes both the data message and the registration information.

Yet further aspects include computer-readable mediums including programming operational on an access terminal. According to one or more examples, such programming may be adapted for obtaining a data message for transmission, and for obtaining registration information associated with the access terminal. The programming may be further adapted for sending a message including the data message and the registration information.

Additional aspects include network nodes including a communications interface and a storage medium coupled with a processing circuit. The processing circuit can be adapted to receive, via the communications interface, a message from an access terminal, where the message includes a data message and access terminal registration information. The processing circuit may further be adapted to register the access terminal with a network based on the access terminal registration information included in the received message.

Further aspects provide methods operational on network nodes and/or network nodes including means to perform such methods. One or more examples of such methods may include receiving a message from an access terminal, where the message includes both a data message and access terminal registration information. The access terminal can subsequently be registered with a network based on the access terminal registration information included in the received message.

Still further aspects include computer-readable mediums including programming operational on a network node. According to one or more examples, such programming may be adapted for receiving from an access terminal a message including a data message and access terminal registration information. The programming may further be adapted for registering the access terminal with a network based on the access terminal registration information included in the received message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DRAWINGS

FIG. 4 is a block diagram illustrating at least some portions of a packet configuration for a System Parameters Message according to at least one implementation.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the discussions are described below for 3rd Generation Partnership Project 2 (3GPP2) 1x protocols and systems, and related terminology may be found in much of the following description. However, those of ordinary skill in the art will recognize that one or more aspects of the present disclosure may be employed and included in one or more other wireless communication protocols and systems.

Figure 1:
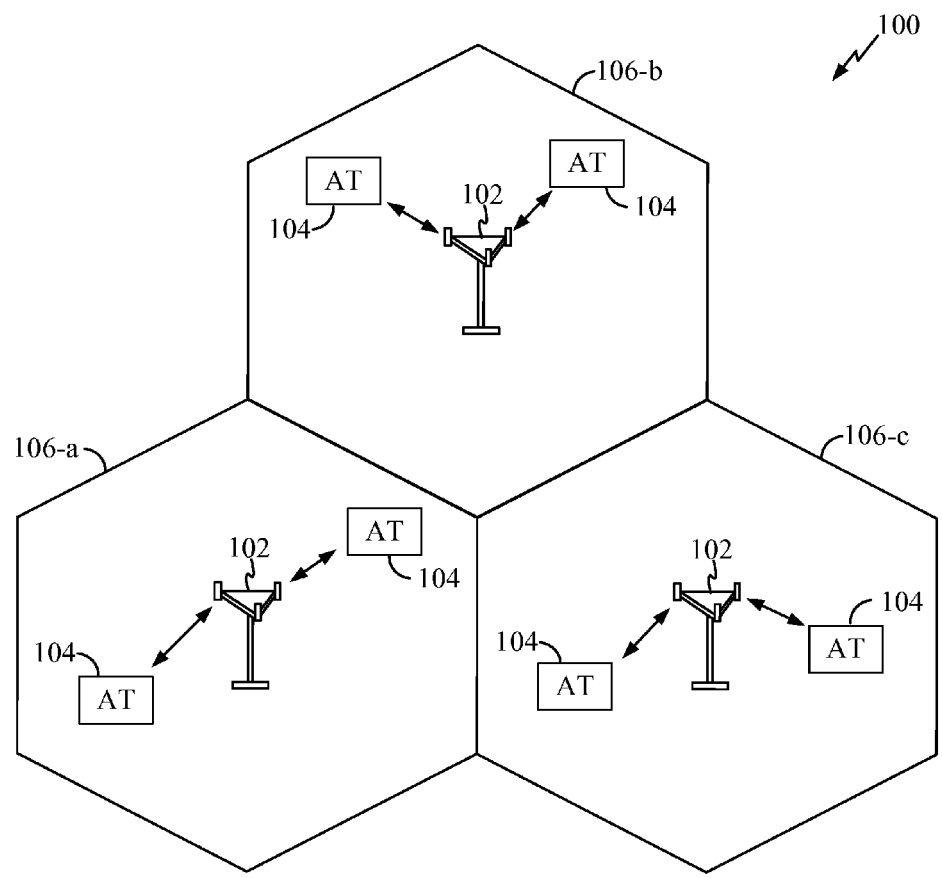
FIG. 1 is a block diagram illustrating an example of a network environment in which one or more aspects of the present disclosure may find application.

FIG. 1 is a block diagram of a network environment in which one or more aspects of the present disclosure may find application. The wireless communications system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. The base stations 102 are configured to communicate with the access terminals 104 under the control of a base station controller (see FIG. 2) via multiple carriers. Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). The system 100 may include base stations 102 of different types (e.g., macro, micro, and/or pico base stations).

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) enabled device, and/or other communication/computing device which communicates, at least partially, through a wireless or cellular network.

Figure 2:
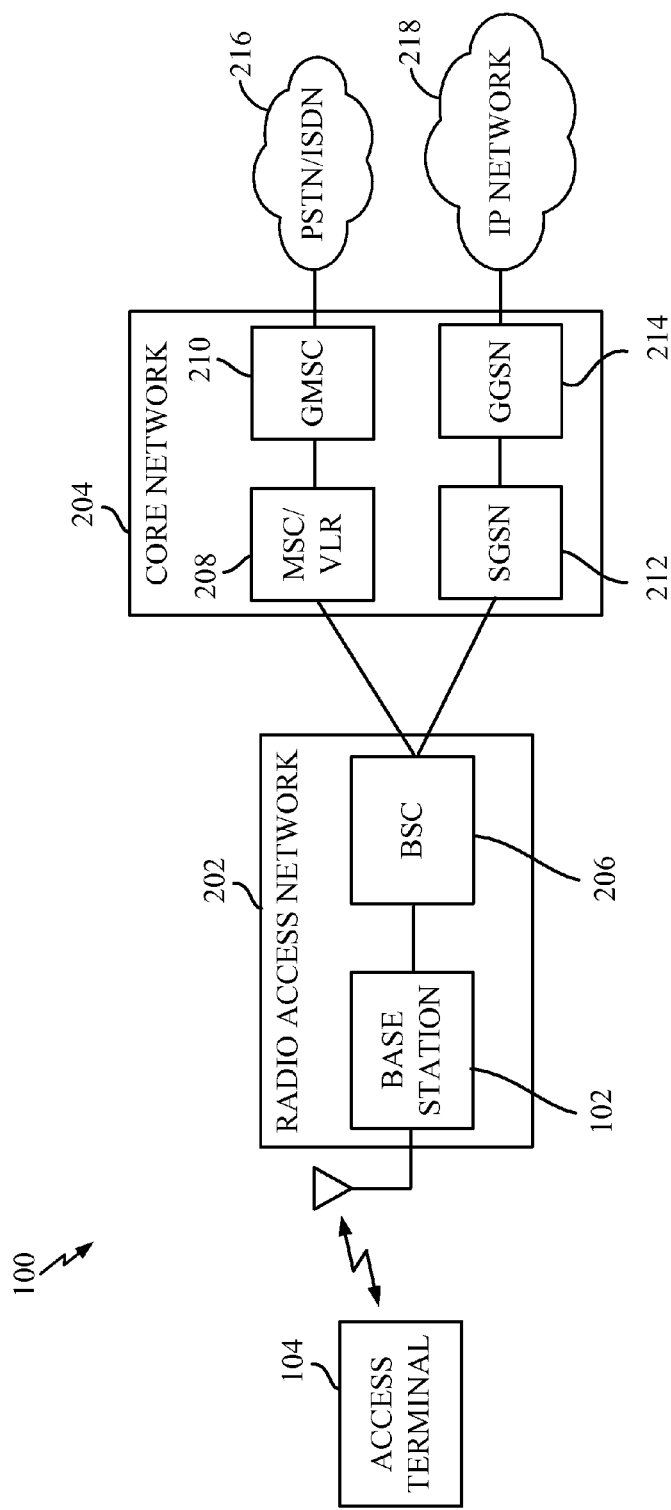
FIG. 2 is a block diagram illustrating select components of the wireless communication system of FIG. 1 according to at least one example.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

As access terminals 104 operate within the wireless communications system 100, the access terminals 104 typically register with the wireless communications system 100 at periodic intervals. For example, the wireless communications system 100 may be adapted to support timer-based registration in which the base stations 102 broadcast a registration period during which time each access terminal 104 within the coverage area for the particular base station 102 can register or re-register with the network. When an access terminal 104 is not active on the wireless network (e.g., no traffic channel setup, or other forms of registration), the idle access terminal 104 performs registration each registration period. Typically, the registration period can be a relatively short interval (e.g., between 15 minutes and 1 hour) in order for the system 100 to track the locations of the various access terminals 104 and avoid page failures, such as in the case of voice-based mobile access terminals.

In some instances, one or more of the access terminals 104 may be employed as machine-to-machine (M2M) enabled devices. Such M2M enabled access terminals 104 are adapted to wirelessly communicate with a network entity (e.g., an M2M server) at least substantially without user interaction. M2M access terminals 104 may include a communications device adapted to capture an event (e.g., a sensor that captures temperature, a meter to capture inventory level, etc.), which is relayed through the wireless communication system 100 to an application (e.g., software program), where the event data can be translated into meaningful information (e.g., temperature needs to be lowered/raised, items need to be restocked, etc.). Such M2M enabled access terminals 104 may be adapted to send/receive data relatively infrequently. For example, a M2M enabled access terminal 104 may be adapted to send/receive data anywhere from every few hours, to once a month, or even longer. In such cases, the timer-based registration periods described above may be burdensome on the M2M enabled access terminals 104. That is, because conventional timer-based registration periods may be relatively short (e.g., on the order of every 15-60 minutes, although some may be less or more frequent), access terminals such as the M2M access terminals may consume substantial battery power in order to maintain registration by registering during each registration period.

According to various aspects of the present disclosure, features may be employed to reduce the frequency at which at least some access terminals, such as M2M enabled access terminals, register with the wireless communications system 100. In at least one example, the wireless communications system 100 may be adapted to facilitate a plurality of different timer-based registration schedules. In at least some examples, the wireless communications system 100 may be adapted to facilitate access terminal registration in response to receiving a data transmission from the access terminal 104.

Figure 3:
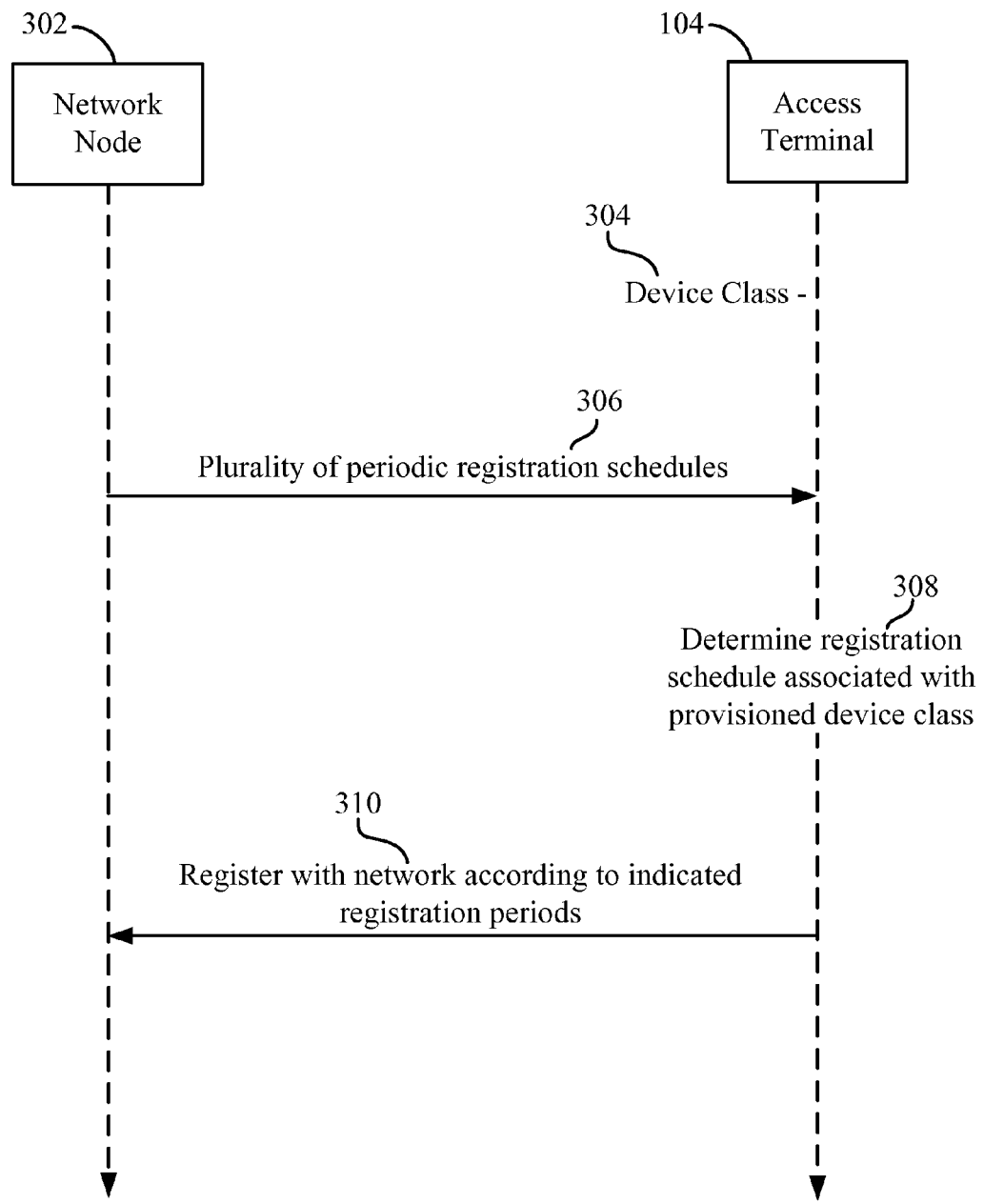
FIG. 3 is a flow diagram illustrating an example for facilitating a plurality of different timer-based registration schedules according to at least one aspect of the present disclosure.

Referring to FIG. 3, a flow diagram is depicted illustrating an example for facilitating a plurality of different timer-based registration schedules according to at least one aspect of the present disclosure. The access terminal 104 can communicate with one or more network nodes 302 associated with the wireless communications system 100, such as a base station (e.g., base station 102 in FIGS. 1 & 2), a base station controller (BSC) (e.g., BSC 206 in FIG. 2), and/or one or more components of the core network (e.g., MSC/VLR 208 in FIG. 2).

Initially, the access terminal 104 may be provided with a particular device class (or class designation) 304. For instance, an access terminal 104 configured for use as a voice-based mobile phone may be provisioned with a device class designation 304 associated with mobile access terminals, whose current location may be important for avoiding page failures. In other instances, an access terminal 104 configured for M2M communication may be provisioned with a device class associated with M2M enabled access terminals, in order to preserve battery life. In some instances, the access terminal 104 may not be provisioned with a specific device class.

The network node 302 can broadcast a message 306 indicating a plurality of periodic registration schedules. In at least some examples, the message 306 may be transmitted as a System Parameters Message (MSG_TAG: SPM). By way of example and not limitation, FIG. 4 illustrates at least some portions of a packet configuration for a System Parameters Message 402 according to at least one example. As shown in FIG. 4, the System Parameters Message 402 includes a conventional 7-bit field for the registration period 404. This registration period field 404 can define the periodic registration schedule for any access terminals 104 that may not have a class designation, or that have a class designation for which no specific registration schedule is defined in the System Parameters Message 402. The System Parameters Message 402 further includes one or more 7-bit device class fields 406 indicating the periodic registration schedules associated with specific access terminal class designations. The class-specific registration schedules of the device class fields 406 may be provided in addition to, or in the alternative to the conventional registration period field 404 for the conventional periodic registration schedule.

Referring again to FIG. 3, the access terminal 104 can determine 308 its registration schedule according to its provisioned device class. In cases in which the network node does not provide a plurality of registration periods or does not provide a matching device class registration period, the access terminal 104 can simply employ the conventional periodic registration schedule (e.g., as indicated by a registration period field 404 in FIG. 4). When the network node 302 supports class-specific registration schedules, the access terminal 104 can register 310 with the network according to the timer-based registration schedule indicated in the message received from the network node 302. According to the foregoing example, an M2M enabled access terminal 104 can employ a registration schedule associated with an M2M device class, which may employ a longer registration period than a conventional registration schedule to conserve battery power of the M2M enabled access terminal 104.

Figure 5:
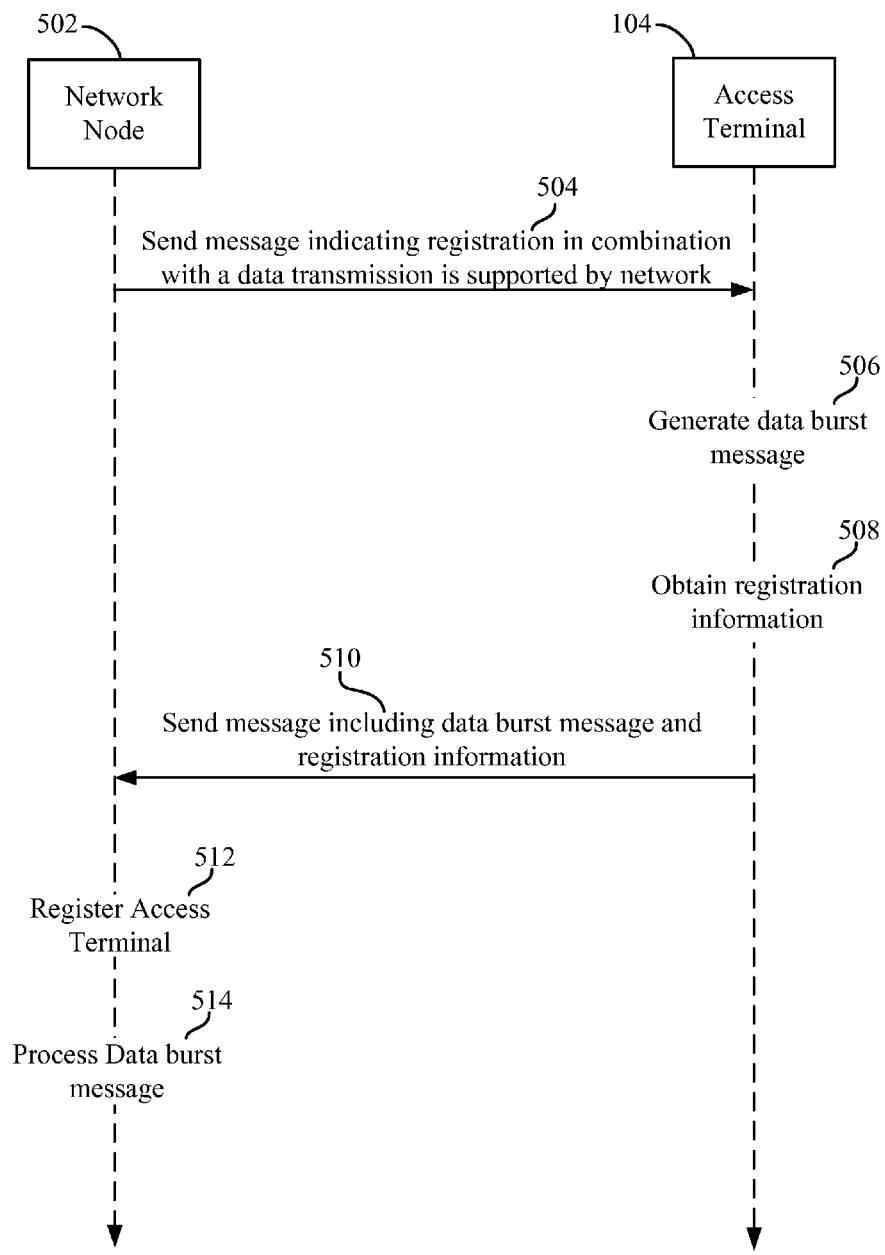
FIG. 5 is a flow diagram illustrating an example for facilitating access terminal registration in response to receiving a data message from the access terminal according to at least one aspect of the present disclosure.

Turning to FIG. 5, a flow diagram is depicted illustrating an example for facilitating access terminal registration in response to the wireless communications system receiving a data message from the access terminal according to at least one aspect of the present disclosure. The access terminal 104 can communicate with one or more network nodes 502 of a wireless communications system. The network node 502 may represent one or more network entities, such as a base station (e.g., base station 102 in FIGS. 1 & 2), a base station controller (BSC) (e.g., BSC 206 in FIG. 2), and/or one or more components of the core network (e.g., MSC/VLR 208 in FIG. 2). Initially, a network node 502 may transmit a message 504 that indicates to the access terminal 104 that the network supports access terminal registration in combination with reception of a data message from the access terminal 104.

In at least one example, a data message may include a data burst message (DBM). By way of example and not limitation, the following discussion refers to a data burst message as the data message transmission. Those of ordinary skill in the art, however, will recognize that one or more other message-types may be employed according to different implementations of the present disclosure.

The access terminal 104, after learning that the network supports access terminal registration in combination to receiving a data message, such as a data burst message, may power down (e.g., enter idle or sleep mode) for a period of time to conserve power, and/or the access terminal 104 may skip registering according to a timer-based registration period. In other implementations, the access terminal 104 may remain current on registration, but may conserve power at the time of sending a data message transmission by combining the access terminal registration with the data message.

At some point in time, the access terminal 104 may obtain data to be transmitted through the network. The access terminal 104 may generate a data burst message 506 including the obtained data. Because the network supports access terminal registration in combination with a data burst message, the access terminal 104 may also obtain registration information 508 associated with the access terminal 104. The access terminal 104 then generates and sends a message 510, which includes the data burst message together with the registration information.

On receipt of the message 510, the network node 502 can register (or update the registration of) 512 the access terminal 104. That is, the network node 502 may register the access terminal 104 based on the received message 510, without the access terminal 104 otherwise connecting to the network node 502. The network node 502 may also process 514 the data burst message according to conventional procedures relating to data burst messages.

Figure 6:
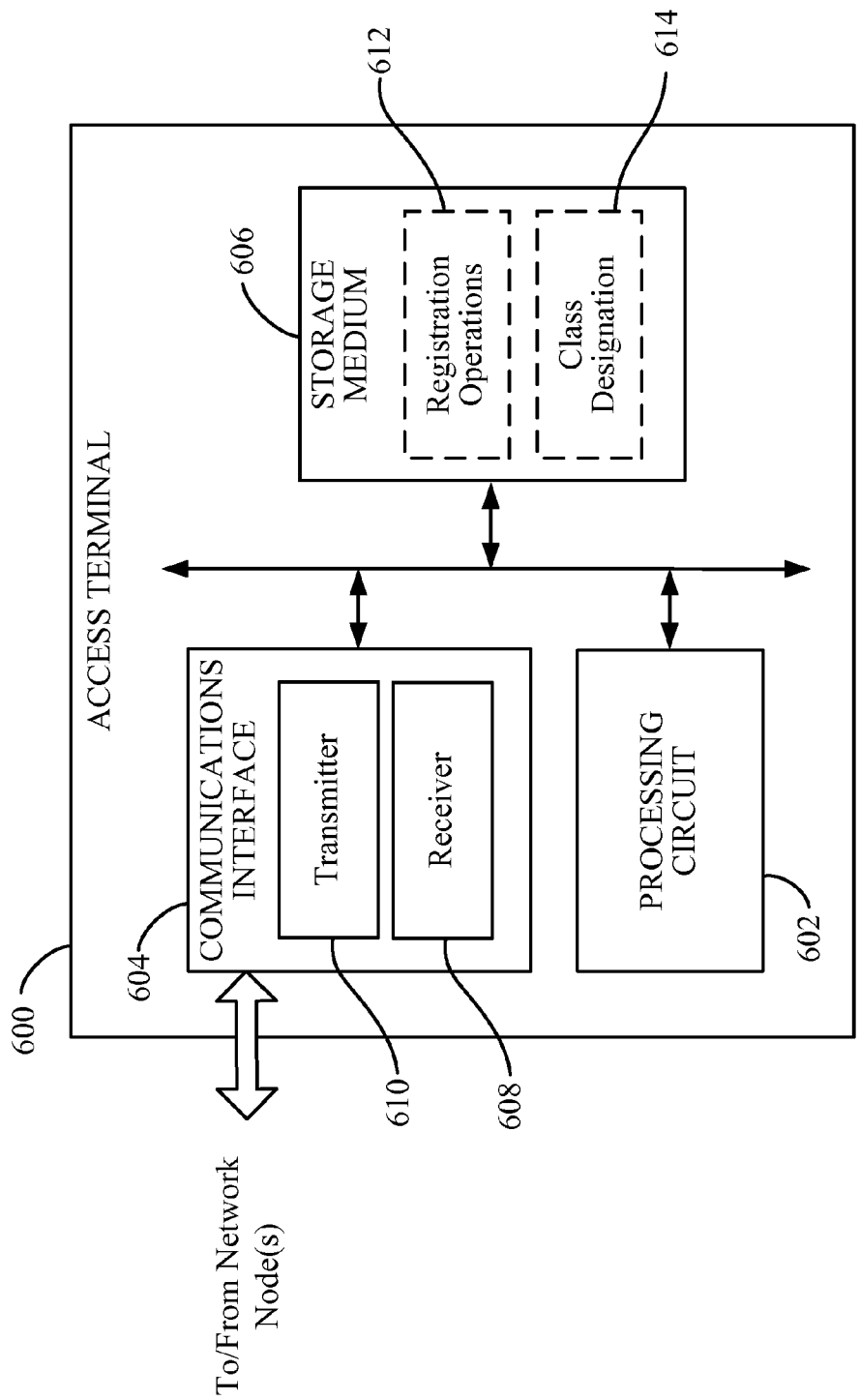
FIG. 6 is a block diagram illustrating select components of an access terminal according to at least one example.

FIG. 6 is a block diagram illustrating select components of an access terminal 600 according to at least one example. As shown, the access terminal 600 generally includes a processing circuit 602 coupled to or placed in electrical communication with a communications interface 604 and a storage medium 606.

The processing circuit 602 is arranged to obtain, process and/or send data, control data access and storage, issue commands, and control other desired operations. The processing circuit 602 may include circuitry adapted to implement desired programming provided by appropriate media in at least one example. For example, the processing circuit 602 may be implemented as one or more processors, one or more controllers, and/or other structure configured to execute executable programming. Examples of the processing circuit 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 602 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 602 are for illustration and other suitable configurations within the scope of the present disclosure are also contemplated.

The processing circuit 602 is adapted for processing, including the execution of programming, which may be stored on the storage medium 606. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 604 is configured to facilitate wireless communications of the access terminal 600. For example, the communications interface 604 may include circuitry and/or programming adapted to facilitate the communication of information bi-directionally with respect to one or more network nodes. The communications interface 604 may be coupled to one or more antennas (not shown), and includes wireless transceiver circuitry, including at least one receiver circuit 608 (e.g., one or more receiver chains) and/or at least one transmitter circuit 610 (e.g., one or more transmitter chains).

The storage medium 606 may represent one or more computer-readable, machine-readable, and/or processor-readable devices for storing programming, such as processor executable code or instructions (e.g., software, firmware), electronic data, databases, or other digital information. The storage medium 606 may also be used for storing data that is manipulated by the processing circuit 602 when executing programming. The storage medium 606 may be any available media that can be accessed by a general purpose or special purpose processor, including portable or fixed storage devices, optical storage devices, and various other mediums capable of storing, containing and/or carrying programming. By way of example and not limitation, the storage medium 606 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 606 may be coupled to the processing circuit 602 such that the processing circuit 602 can read information from, and write information to, the storage medium 606. That is, the storage medium 606 can be coupled to the processing circuit 602 so that the storage medium 606 is at least accessible by the processing circuit 602, including examples where the storage medium 606 is integral to the processing circuit 602 and/or examples where the storage medium 606 is separate from the processing circuit 602 (e.g., resident in the access terminal 600, external to the access terminal 600, and/or distributed across multiple entities).

Programming stored by the storage medium 606, when executed by the processing circuit 602, causes the processing circuit 602 to perform one or more of the various functions and/or process steps described herein. For example, the storage medium 606 may include registration operations 612, and/or a class designation 614. The registration operations 612 can be implemented by the processing circuit 602 to perform access terminal registrations during a registration period according to the class designation 614 and/or in combination with a data message transmission. The class designation 614 may include data adapted to identify a class of access terminal employed to determine a proper registration period to be employed by the access terminal 600. In examples where the class designation 614 is included, the class designation 614 may be provisioned in the access terminal 600 by the manufacturer or at some other time. Thus, according to one or more aspects of the present disclosure, the processing circuit 602 is adapted to perform (in conjunction with the storage medium 606) any or all of the processes, functions, steps and/or routines for any or all of the access terminals described herein (e.g., access terminal 104 and/or 600). As used herein, the term "adapted" in relation to the processing circuit 602 may refer to the processing circuit 602 being one or more of configured, employed, implemented, and/or programmed to perform a particular process, function, step and/or routine according to various features described herein.

Figure 7:
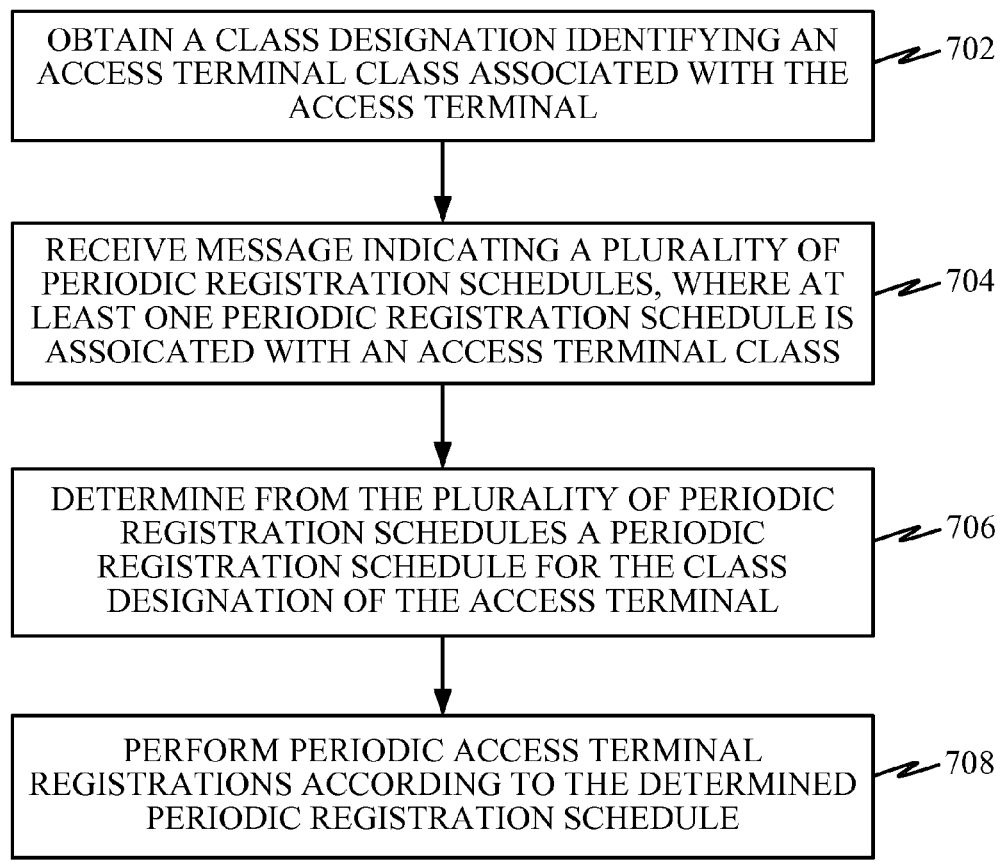
FIG. 7 is a flow diagram illustrating a method operational on an access terminal according to at least one implementation.

In some instances, the access terminal 600 (e.g., the registration operations 612) may be adapted to identify a periodic registration schedule associated with its respective device class designation (if any), and register with the network according to the identified periodic registration schedule. In this manner, each of a plurality of period registration schedules can be employed by different access terminals without affecting the registration schedules for other access terminals. FIG. 7 is a flow diagram illustrating a related method operational on an access terminal, such as access terminal 600, according to at least one example.

Referring to FIGS. 6 and 7, the access terminal 600 may obtain a class designation identifying an access terminal class designation associated with the access terminal 600 at step 702. For example, the processing circuit 602 may obtain the class designation 614, and may store the class designation 614 in the storage medium 606. The class designation 614 can indicate a class for the access terminal 600 with respect to periodic registration schedules available in a particular network. In some instances, however, the access terminal 600 may not obtain any particular class designation.

At step 704, the access terminal 600 may receive a message indicating a plurality of periodic registration schedules. At least one periodic registration schedule included in the received message can be associated with an access terminal class designation. In at least one example, the processing circuit 602 executing the registration operations 612 may receive the message via the communications interface 604. In at least some implementations, the received message may be a System Parameters Message (MSG_TAG: SPM). Such a system parameters message may be similar to the system parameters message 402 described above with reference to FIG. 4, including a registration period field (e.g., registration period field 404 in FIG. 4) indicating a periodic registration schedule for access terminals without a class designation, and at least one device class field (e.g., device class field 406 in FIG. 4) indicating a periodic registration schedule associated with a class designation.

At step 706, the access terminal 600 may determine, from the plurality of periodic registration schedules, a periodic registration schedule for the class designation associated with the access terminal 600. For instance, the processing circuit 602 executing the registration operations 612 can determine a periodic registration schedule associated with the class designation 614 stored in the storage medium 606. In examples where the message received at step 704 is similar to the system parameters message depicted in FIG. 4, the processing circuit 602 executing the registration operations 612 may evaluate the received message to identify a device class field associated with the class designation 614. When a device class field associated with the class designation 614 is identified, the processing circuit 602 executing the registration operations 612 can apply the indicated periodic registration schedule for performing access terminal registrations with a network.

In some instances, the access terminal 600 may not be provided with a specific device class. In other instances, the message received at step 704 may not include a periodic registration schedule associated with the class designation 614 for the access terminal 600. In such cases, the processing circuit 602 executing the registration operations 612 can employ the conventional registration period for the particular network. For example, when the access terminal 600 has no class designation 614, the processing circuit 602 executing the registration operations 612 can employ the periodic registration schedule indicated by the registration period field (e.g., registration period field 404 in FIG. 4) of the received message. Similarly, when the processing circuit 602 executing the registration operations 612 determines that the received message does not include a periodic registration schedule associated with the class designation 614 (e.g., no device class field for the class designation 614), the processing circuit 602 executing the registration operations 612 can employ the periodic registration schedule indicated by the registration period field (e.g., registration period field 404 in FIG. 4) of the received message.

At step 708, the access terminal 600 may perform periodic access terminal registrations according to the determined periodic registration schedule. For instance, the processing circuit 602 executing the registration operations 612 can perform periodic registrations with the network according to the periodic registration schedule. In one or more examples where the class designation 614 is associated with M2M enabled devices, the processing circuit 602 may send registration information via the communications interface 604 during each registration period (e.g., once every 10 minutes, once every hour, or longer).

Figure 8:
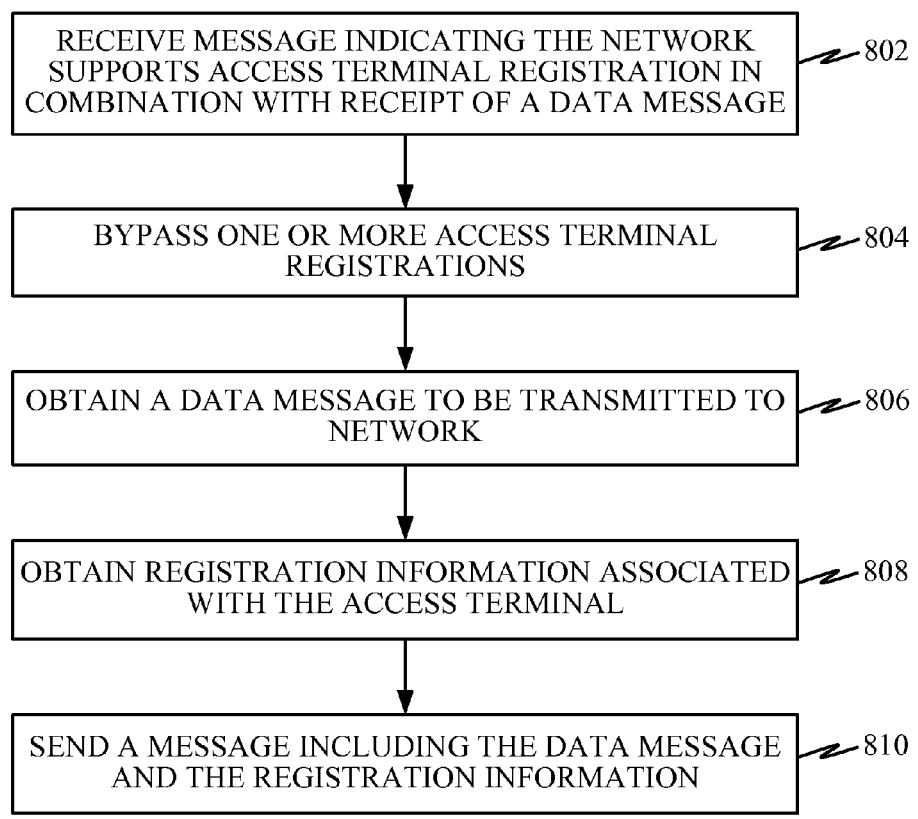
FIG. 8 is a flow diagram illustrating another method operational on an access terminal according to at least one implementation.

In some instances, the access terminal 600 (e.g., the registration operations 612) can be adapted to perform registration with a network by sending a data message, such as a data burst message. Such access terminal registrations can be performed even when the access terminal 600 is not currently registered or connected to the network. In this manner, the access terminal 600 can power down (e.g., enter sleep and/or idle modes) and skip registrations, but still transmit data when data is obtained for transmission. FIG. 8 is a flow diagram illustrating a related method operational on an access terminal, such as the access terminal 600, according to at least one implementation.

Referring to FIGS. 6 and 8, an access terminal 600 may receive a message from a network node indicating that the network node supports access terminal registration in combination with receipt of a data message at step 802. For example, the processing circuit 602 may receive the message via the communications interface 604. In at least one example, the received message may be a system parameters message that includes a field (e.g., a one-bit or multi-bit field) adapted to indicate to the processing circuit 602 executing the registration operations 612 that the network supports access terminal registration in combination with receiving a data message transmission.

With knowledge that the network supports access terminal registration in combination with receiving a data message transmission, the access terminal 600 may bypass one or more access terminal registrations at step 804. For instance, the processing circuit 602 executing the registration operations 612 may skip one or more periodic registrations with the network, which may result in the access terminal 600 no longer being registered with the network.

At step 806, the access terminal 600 may obtain a data message to be transmitted to the network. For example, the processing circuit 602 may prepare data according to conventional processes to be transmitted to the network. In at least some examples, the data may be prepared as a data burst message. A data burst message can be employed for transmission of relatively small amounts of data without setting up a connection between the network and the access terminal 104. One example of a data burst message includes a short message service (SMS) transmission, commonly referred to as a "text message". In some examples, data burst messages can be sent using a reverse common signaling channel (R-CSCH) such as, for example, the reverse access channel (R-ACH). Data burst messages can be employed by an M2M enabled access terminal 104 for transmitting to an M2M server data associated with a captured event.

Because the network supports access terminal registration in combination with a data message, the access terminal 600 may also obtain registration information associated with the access terminal 600 at step 808. For example, the processing circuit 602 executing the registration operations 612 may obtain registration information associated with the access terminal 600. The registration information may include information such as a slot cycle index and/or other information that is conventionally employed by a network for access terminal registrations. In at least some implementations, the processing circuit 602 executing the registration operations 612 may generate a new record (e.g., GE_REC_TYPE) with the relevant registration information.

At step 810, the access terminal 600 can send a message including the data message obtained at step 806 and the access terminal registration information obtained at step 808. For example, the processing circuit 602 executing the registration operations 612 may generate a message including the data message and the registration information. In at least one implementation, the processing circuit 602 executing the registration operations 612 may generate the message by encapsulating the data message (e.g., a data burst message) and the registration information (e.g., the new record) into a single generate extension message (GEM). The processing circuit 602 executing the registration operations 612 may then transmit the prepared message (e.g., the general extension message) via the communications interface 604.

Figure 9:
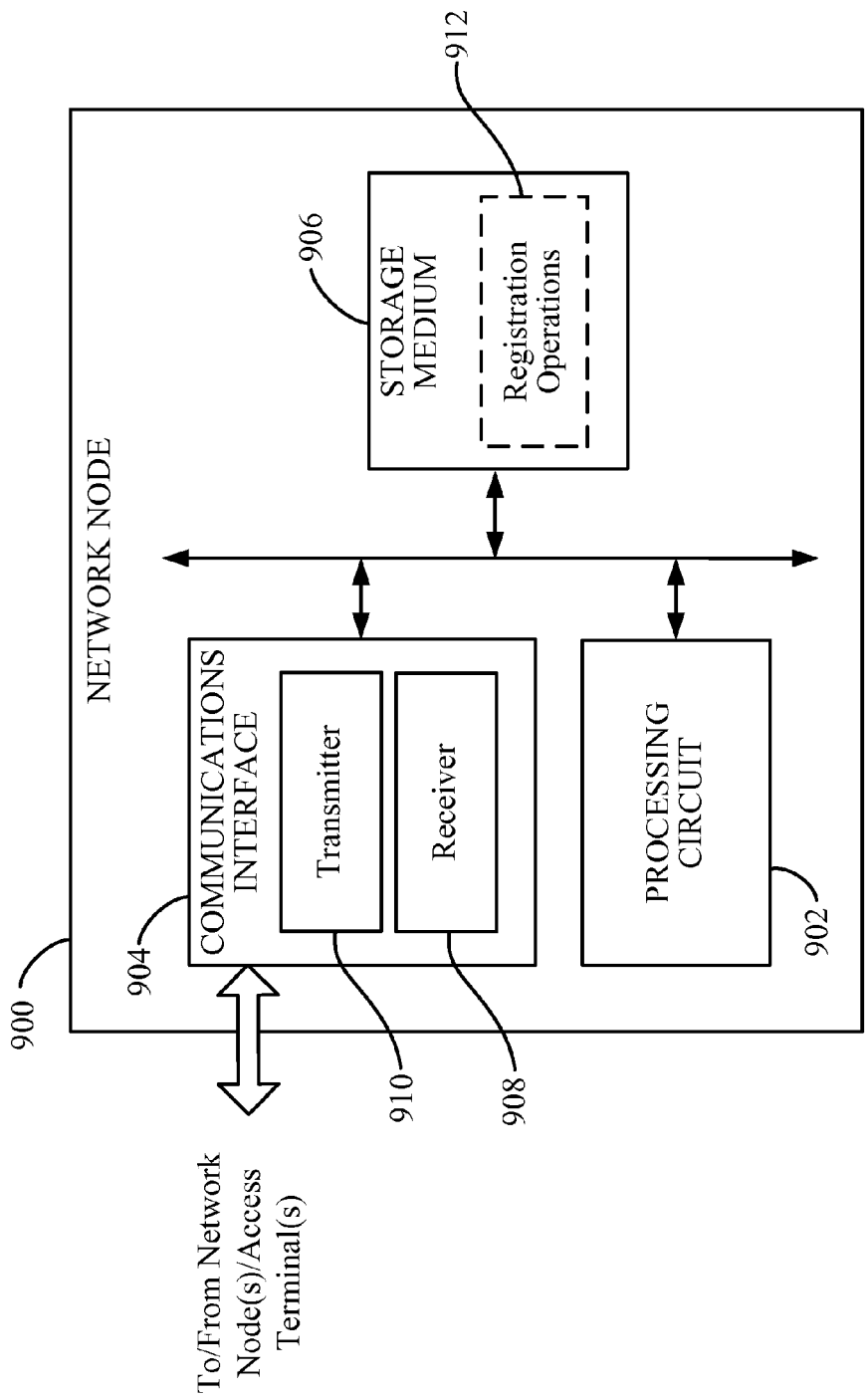
FIG. 9 is a block diagram illustrating select components of a network node according to at least one example.

FIG. 9 is a block diagram illustrating select components of a network node 900 according to at least one implementation. As shown, the network node 900 includes a processing circuit 902 coupled to or placed in electrical communication with a communications interface 904 and to a storage medium 906.

The processing circuit 902 is arranged to obtain, process and/or send data, control data access and storage, issue commands, and control other desired operations. The processing circuit 902 may include circuitry adapted for processing, including the execution and implementation of programming provided by appropriate media, including media stored on the storage medium 606 in at least one example. Examples and implementations for the processing circuit 902 may include any of the various examples and implementations of the processing circuit 602 described above with reference to FIG. 6. The examples of the processing circuit 902 including those set forth with reference to the processing circuit 602 in FIG. 6 are for illustration, and other suitable configurations within the scope of the present disclosure are also contemplated.

The communications interface 904 is configured to facilitate wired and/or wireless communications of the network node 900. For example, the communications interface 904 may include circuitry and/or programming adapted to facilitate the communication of information bi-directionally with respect to one or more access terminals, as well as one or more other network nodes. The communications interface 904 may be coupled to one or more antennas (not shown), and includes wireless transceiver circuitry, including at least one receiver circuit 908 (e.g., one or more receiver chains) and/or at least one transmitter circuit 910 (e.g., one or more transmitter chains).

The storage medium 906 may represent one or more computer-readable, machine-readable, and/or processor-readable devices for storing programming, such as processor executable code or instructions (e.g., software, firmware), electronic data, databases, or other digital information. The storage medium 906 may also be used for storing data that is manipulated by the processing circuit 902 when executing programming. The storage medium 906 may be any available media that can be accessed by a general purpose or special purpose processor, including portable or fixed storage devices, optical storage devices, and various other mediums capable of storing, containing and/or carrying programming. Examples of the storage medium 906 may include any of the examples included in the description of the storage medium 606 set forth above with reference to FIG. 6.

The storage medium 906 may be coupled to the processing circuit 902 such that the processing circuit 902 can read information from, and write information to, the storage medium 906. That is, the storage medium 906 can be coupled to the processing circuit 902 so that the storage medium 906 is at least accessible by the processing circuit 902, including examples where the storage medium 906 is integral to the processing circuit 902 and/or examples where the storage medium 906 is separate from the processing circuit 902 (e.g., resident in the network node 900, external to the network node 900, and/or distributed across multiple entities).

Programming stored by the storage medium 906, when executed by the processing circuit 902, causes the processing circuit 902 to perform one or more of the various functions and/or process steps described herein. For example, the storage medium 906 may include registration operations 912. The registration operations 912 can be implemented by the processing circuit 902 to perform access terminal registrations during a plurality of registration periods according to class designations and/or in combination with a data message transmission. Thus, according to one or more aspects of the present disclosure, the processing circuit 902 is adapted to perform (in conjunction with the storage medium 906) any or all of the processes, functions, steps and/or routines for any or all of the network nodes described herein (e.g., network nodes 302, 402, and/or 900). As used herein, the term "adapted" in relation to the processing circuit 902 may refer to the processing circuit 902 being one or more of configured, employed, implemented, and/or programmed to perform a particular process, function, step and/or routine according to various features described herein.

Figure 10:
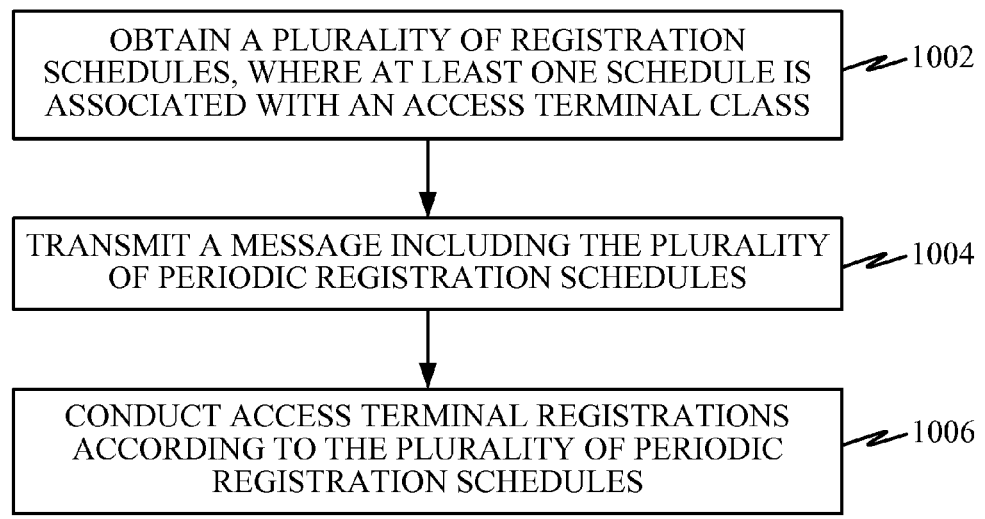
FIG. 10 is a flow diagram illustrating a method operational on a network node according to at least one implementation.

In some instances, the network node 900 can be adapted to facilitate a plurality of different timer-based registration periods. For example, the network node 900 can be adapted in at least some implementations to facilitate different timer-based registration periods based on device class. FIG. 10 is a flow diagram illustrating a related method operational on a network node, such as the network node 900, according to at least one implementation.

Referring to FIGS. 9 and 10, a network node 900 may obtain a plurality of periodic registration schedules at step 1002. At least one periodic registration schedule of the plurality can be associated with an access terminal class. In at least one example, the processing circuit 902 executing the registration operations 912 may obtain the plurality of registration schedules. In some instances, the processing circuit 902 executing the registration operations 912 may generate the plurality of periodic registration schedules. In other instances, the processing circuit 902 executing the registration operations 912 may receive the plurality of periodic registration schedules via the communications interface 904 from another network entity.

At least one of the periodic registration schedules may be a registration schedule for any access terminal without a class designation. One or more of the other periodic registration schedules may be associated with an access terminal class. For instance, a periodic registration schedule may be implemented for a first class of access terminals, such as voice-based mobile phones, where the registration schedule may include periods of only a few minutes so the network can track the locations of the various access terminals and avoid page failures. Another periodic registration schedule may be implemented for a second class of access terminal, such as M2M enabled access terminals, where the registration period may be substantially longer (e.g., every 10 minutes, every hour, or longer).

At step 1004, the network node 900 may transmit a message including the plurality of periodic registration schedules. For instance, the processing circuit 902 executing the registration operations 912 may transmit the message via the communications interface 904. In one or more implementations, the message may be a system parameters message, such as the system parameters message 402 described above with reference to FIG. 4. As described above, the system parameters message 402 can include a registration period field indicating a periodic registration schedule for access terminals without a class designation, and one or more device class fields indicating a periodic registration schedule associated with an access terminal class designation.

At step 1006, the network node 900 may conduct access terminal registrations according to the plurality of periodic registration schedules. For example, the processing circuit 902 executing the registration operations 912 may conduct the access terminal registrations according to the respective registration periods associated with the registration schedules. In at least one example, the processing circuit 902 executing the registration operations 912 may receive registration transmissions via the communications interface 904 from one or more access terminals during each respective registration period. The processing circuit 902 executing the registration operations 912 can further register each respective access terminal from which a registration transmission is received.

Figure 11:
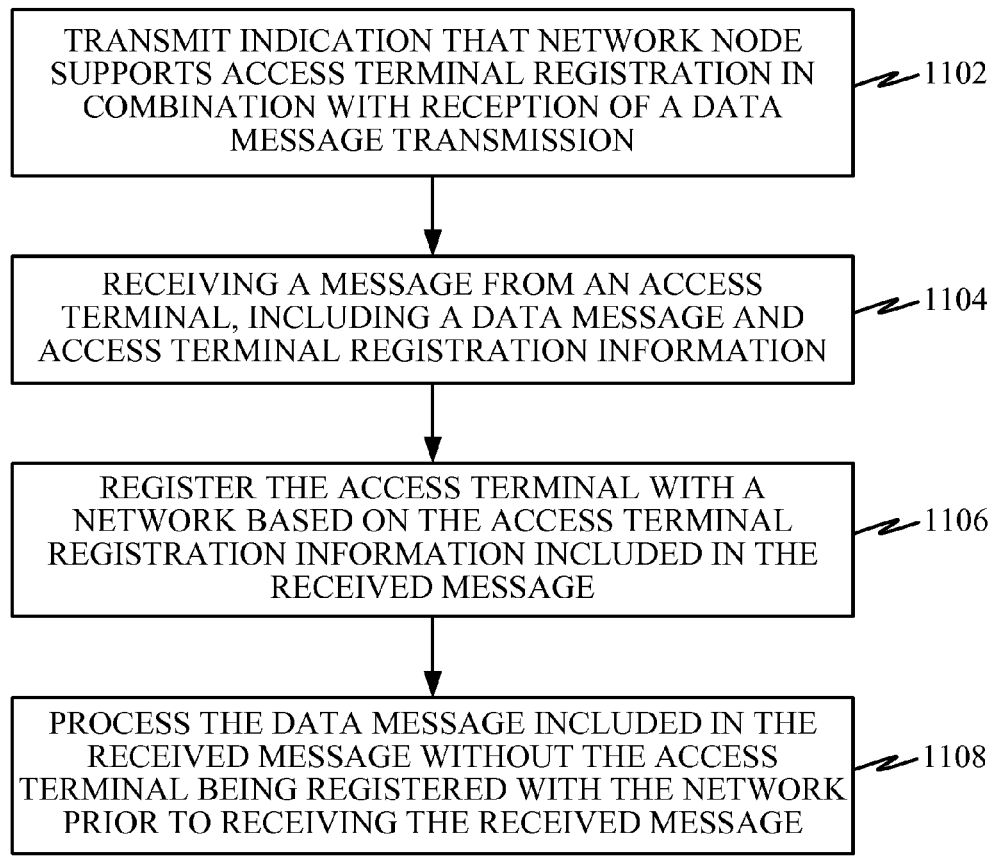
FIG. 11 is a flow diagram illustrating another method operational on a network node according to at least one implementation.

In some instances, the network node 900 can be adapted to register an access terminal in combination with receiving a data message from the access terminal Such registrations may be performed even when the access terminal is not currently registered or connected with the network. In this manner, the network node 900 can register an access terminal that may have bypassed one or more registrations, and subsequently transmits a data message. FIG. 11 is a flow diagram illustrating a related method operational on a network node, such as the network node 900, according to at least one implementation.

Referring to FIGS. 9 and 11, a network node 900 may transmit an indication that the network node 900 supports access terminal registration in combination with reception of a data message at step 1102. For example, the processing circuit 902 executing the registration operations 912 may broadcast a message via the communications interface 904, where the message is adapted to indicate to a receiving access terminal that registration can be conducted in combination with transmitting a data message. In at least one implementation, the message broadcast by the network node 900 may be a system parameters message. The indication in such implementations may be a one-bit or multi-bit field in the system parameters message adapted to indicate network support for access terminal registration in combination with receiving a data message transmission.

At step 1104, the network node 900 may receive a message from an access terminal, where the message includes a data message and access terminal registration information. For instance, the processing circuit 902 executing the registration operations 912 may receive the message from an access terminal via the communications interface 904. In one or more examples, the received message may be a general extension message including the data message and the registration information. The data message included in the received message may be a data burst message in one or more instances.

At step 1106, the network node 900 can register the access terminal with a network based on the access terminal registration information included in the received message. For instance, in response to receiving the message from an access terminal, the processing circuit 902 executing the registration operations 912 can register the particular access terminal with the network according to the access terminal registration information included in the received message.

In addition to registering the access terminal, the network node 900 may also process the data message included in the received message at step 1108. For example, processing circuit 902 may process the data message included in the received message even without the access terminal being registered with the network prior to receiving the message at step 1106. The data message (e.g., data burst message) may be processing according to conventional processing for received data messages in a wireless network.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10 and/or 11 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2, 6 and/or 9 may be configured to perform or employ one or more of the methods, features, parameters, or steps described in FIGS. 3, 4, 5, 7, 8, 10 and/or 11. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
  a communications interface; a storage medium; and
  a processing circuit coupled to the communications interface and the storage medium, the processing circuit adapted to:
    receive via the communications interface a transmission indicating that a network in which the access terminal is currently operating supports access terminal registration in combination with receipt of a data message;
    skip one or more periodic registrations;
    obtain a data message for transmission;
    obtain registration information associated with the access terminal to be sent in combination with the data message; and
    send a message via the communications interface, the message comprising the data message and the registration information.

2. The access terminal of claim 1, wherein the message comprising the data message together with the registration information is a general extension message.

3. The access terminal of claim 1, wherein the data message comprises a data burst message.

4. The access terminal of claim 1, wherein the processing circuit is adapted to: obtain the registration information associated with the access terminal to be sent with the data message in response to the indication that the network supports access terminal registration in combination with receipt of a data message.

5. A method operational on an access terminal, comprising:
  receiving a transmission indicating that a network in which the access terminal is operating supports access terminal registration in combination with receipt of a data message;
  bypassing one or more periodic access terminal registrations;
  obtaining a data message for transmission;
  obtaining registration information associated with the access terminal to be sent in combination with the data message; and
  sending a message comprising the data message and the registration information.

6. The method of claim 5, wherein obtaining a data message for transmission comprising:
  obtaining a data burst message for transmission.

7. The method of claim 5, wherein sending the message comprising the data message and the registration information comprises:
  sending a general extension message comprising the data message and the registration information.

8. The method of claim 5, wherein receiving the transmission indicating that a network in which the access terminal is operating supports access terminal registration in combination with receipt of a data message comprises:
  receiving the transmission indicating that a network in which the access terminal is operating supports access terminal registration in combination with receipt of a data message prior to sending the message comprising the data message and the registration information.

9. The method of claim 5, wherein obtaining the registration information associated with the access terminal to be sent in combination with the data message comprises:
  obtaining the registration information associated with the access terminal to be sent in combination with the data message in response to the indication that the network supports access terminal registrations in combination with receipt of a data message.

10. An access terminal, comprising:
  means for receiving a transmission indicating that a network in which the access terminal is operating supports access terminal registration in combination with receipt of a data message;
  means for bypassing one or more periodic access terminal registrations;
  means for obtaining a data message for transmission;
  means for obtaining registration information to be sent in combination with the data message, wherein the registration information is associated with the access terminal; and
  means for sending a message comprising the data message and the registration information.

11. The access terminal of claim 10, wherein the transmission indicating that a network in which the access terminal is operating supports access terminal registration in combination with receipt of a data message is received prior to sending the message comprising the data message and the registration information.

12. The access terminal of claim 10, wherein the registration information to be sent in combination with the data message is obtained in response to the indication that the network supports access terminal registrations in combination with receipt of a data message.

13. A non-transitory computer-readable medium, comprising programming for:
- receiving a transmission indicating that a network in which the access terminal is operating supports access terminal registration in combination with receipt of a data message;
- skipping one or more periodic registrations;
- obtaining a data message for transmission;
- obtaining registration information to be sent in combination with the data message, wherein the registration information is associated with the access terminal; and
- sending a message comprising the data message and the registration information.

14. The computer-readable medium of claim 13, wherein the registration information to be sent in combination with the data message is obtained in response to the indication that the network supports access terminal registrations in combination with receipt of a data message.

15. A network node, comprising:
- a communications interface;
- a storage medium; and
- a processing circuit coupled to the communications interface and the storage medium, the processing circuit adapted to:
  - broadcast via the communications interface an indication that the network node supports access terminal registration in combination with a data message transmission;
  - receive via the communications interface a message from an access terminal that has skipped one or more periodic registrations, wherein the message comprises a data message and access terminal registration information; and
  - register the access terminal with a network based on the access terminal registration information included in the received message.

16. The network node of claim 15, wherein the received message comprises a general extension message.

17. The network node of claim 15, wherein the data message included in the received message comprises a data burst message.

18. The network node of claim 15, wherein the indication that the network node supports access terminal registration in combination with a data message transmission comprises a field broadcast in a system parameters message.

19. The network node of claim 15, wherein the processing circuit is further adapted to: process the data message included in the received message without the access terminal being registered with the network prior to receiving the received message.

20. A method operational on a network node, comprising:
- transmitting an indication that the network node supports access terminal registration in combination with reception of a data message;
- receiving a message from an access terminal that has skipped one or more periodic registrations, the message comprising a data message and access terminal registration information; and
- registering the access terminal with a network based on the access terminal registration information included in the received message.

21. The method of claim 20, wherein receiving the message from the access terminal comprises:
- receiving a general extension message comprising the data message and the access terminal registration information.

22. The method of claim 20, wherein receiving the message from the access terminal, the message comprising the data message and the access terminal registration information comprises:
- receiving the message from the access terminal, the message comprising a data burst message and the access terminal registration information comprises.

23. The method of claim 20, wherein transmitting the indication that the network node supports access terminal registration in combination with reception of a data message comprises:
- transmitting a system parameters message comprising a field indicating that the network node supports access terminal registration in combination with reception of a data message.

24. The method of claim 20, further comprising:
- processing the data message included in the received message without the access terminal being registered with the network prior to receiving the received message.

25. A network node, comprising:
- means for broadcasting an indication that the network node supports access terminal registration in combination with reception of a data message;
- means for receiving a message from an access terminal that has skipped one or more periodic registrations, the message comprising a data message and access terminal registration information; and
- means for registering the access terminal with a network based on the access terminal registration information included in the received message.

26. The network node of claim 25, wherein the received message comprises a general extension message.

27. The network node of claim 25, wherein the data message included in the received message comprises a data burst message.

28. The network node of claim 25, wherein the indication that the network node supports access terminal registration in combination with reception of a data message comprises a field broadcast in a system parameters message.

29. The network node of claim 25, further comprising:
- means for processing the data message included in the received message without the access terminal being registered with the network prior to receiving the received message.

30. A non-transitory computer-readable medium, comprising programming for:
- transmitting an indication that the network node supports access terminal registration in combination with reception of a data message;
- receiving a message from an access terminal that has skipped one or more periodic registrations, the message comprising a data message and access terminal registration information; and
- registering the access terminal with a network based on the access terminal registration information included in the received message.

31. The computer-readable medium of claim 30, wherein the indication that the network node supports access terminal registration in combination with reception of a data message comprises a field included in a system parameters message.

32. The computer-readable medium of claim 30, further comprising programming for: processing the data message included in the received message without the access terminal being registered with the network prior to receiving the received message.

* * * * *